United States Patent

Aalto et al.

[11] Patent Number: 4,674,531
[45] Date of Patent: Jun. 23, 1987

[54] FLOW REGULATOR

[75] Inventors: Erkki Aalto; Veikko Ylä-Hemmilä; Reijo Villikka, all of Kausala, Finland

[73] Assignee: Halton Oy, Finland

[21] Appl. No.: 694,402

[22] PCT Filed: May 17, 1984

[86] PCT No.: PCT/FI84/00036
§ 371 Date: Jan. 7, 1985
§ 102(e) Date: Jan. 7, 1985

[87] PCT Pub. No.: WO84/04802
PCT Pub. Date: Dec. 6, 1984

[30] Foreign Application Priority Data

May 20, 1983 [FI] Finland .................................. 831800

[51] Int. Cl.⁴ .......................................... F16K 31/18
[52] U.S. Cl. .................................. 137/499; 137/519; 137/556; 137/557
[58] Field of Search ............... 137/519, 556, 557, 499; 251/285, 286, 287, 305; 138/45, 46

[56] References Cited

U.S. PATENT DOCUMENTS

| 41,644 | 2/1864 | Shaw | 251/287 |
|---|---|---|---|
| 1,281,645 | 7/1918 | Penzensky . | |
| 1,306,006 | 6/1919 | Gustafson | 251/285 |
| 1,311,202 | 7/1919 | Anderson | 137/499 |
| 1,766,876 | 6/1930 | Busby . | |
| 3,538,945 | 11/1970 | Dean, Jr. | 137/499 |
| 3,905,390 | 9/1975 | Pysh | 137/519 |
| 4,420,438 | 12/1983 | Goosen | 251/305 |
| 4,523,609 | 6/1985 | Weck | 137/499 |

FOREIGN PATENT DOCUMENTS

| 74254 | 3/1918 | Austria | 137/519 |
|---|---|---|---|
| 2448271 | 4/1976 | Fed. Rep. of Germany . | |
| 2635338 | 4/1978 | Fed. Rep. of Germany . | |
| 3128726 | 2/1983 | Fed. Rep. of Germany . | |
| 64995 | 10/1983 | Finland . | |
| 775544 | 12/1934 | France | 137/519 |
| 1313310 | 11/1962 | France . | |
| 2392302 | 12/1978 | France . | |
| 48558 | 5/1917 | Sweden . | |
| 302677 | 7/1968 | Sweden . | |
| 400391 | 3/1978 | Sweden . | |

Primary Examiner—Martin P. Schwadron
Assistant Examiner—Sheri M. Novack
Attorney, Agent, or Firm—Steinberg & Raskin

[57] ABSTRACT

The present invention concerns a flow regulator for gaseous substances, particularly a flow regulator intended for air in air-conditioning and ventilation installations, for maintaining the volumetric flow of the gaseous substance at desired magnitude with sufficient accuracy when the differential pressure acting across the flow regulator varies within given limits. The flow regulator comprises an envelope and a regulating member turnably disposed in the flow passage confined by the envelope (11). The torque produced by the flow of gaseous substance on the regulating member and on the other hand a counter-torque dependent on the position of the regulating member cause the regulating member turning in the flow passage to assume a position of equilibrium such that the requisite pressure drop is obtained for maintaining the volumetric flow rate at predetermined magnitude. The range of operation of the flow regulator is changeable by regulating the size, dependent on the different angular positions of the regulating member, of the efective flow aperture between the regulating member and the flow passage. The effective size of the regulating member is changeble in order to change the size of the effective flow aperture. The regulating member is composed of parts placed to overlap and disposed to move so that the effective size of the regulating member is changeable.

22 Claims, 14 Drawing Figures

FLOW REGULATOR

BACKGROUND OF THE INVENTION

The present invention concerns a flow regulator for gaseous substances, in particular for air in air-conditioning and ventilation installations, serving to maintain the volumetric flow of a gaseous substance at desired magnitude with sufficient accuracy when the differential pressure across the flow regulator varies within given limits, said flow regulator comprising an envelope and a regulating member turnably disposed in a flow passage confined by the envelope, and which, when the differential pressure increases, turns progressively towards a position at right angles to the direction of flow, the torgue exerted by the flow of the gaseous substance on the regulating member and on the other hand a counter-torque dependent on the position of the regulating member causing the regulating member turning in the flow passage to assume a position of equilibrium in which the required pressure drop is obtained for keeping the volumetric flow at predetermined magnitude.

In low pressure regulators of prior art, which allow fairly wide regulation of the volumetric flow set-point, the lowest pressure at which the means starts to operate increases with increasing volumetric flow rate. Even at small volumetric flows, the lowest pressure is usually relatively high. The high end pressure also increases with increasing volumetric flow rate set-point.

Because the lowest pressure is high and/or because it depends on the volumetric flow set-point value, the regulators of prior art, in order to function, require extra blower energy and possibly a bigger blower; owing to the increase of pressure they tend to cause noise problems; they impede the designing work, and they cause difficulties in the implementation phase of the installation.

In general, the accurate and stepless setting of the volumetric flow in flow regulators at the site of installation with accuracy and steplessly is exceedingly difficult and often impossible in practice, particularly if the regulator has been installed already, and it is also a fact that the flow rate setting cannot be directly read. Regulators of prior art also do not allow the throttling pressure to be read with which the regulator impedes the flow. It is true that in certain regulator designs of the prior art, one may observe from the outside whether the regulator is within its operating range, but they allow no regulation of the volumetric flow rate.

A prerequisite of serial manufacturing, storing, distribution and convenient use of regulators is that they can with ease and accuracy be regulated at the site of installation, also after installation. It is important with a view to the balancing and inspection of an air-conditioning installation that it is possible to observe from outside the regulator which set-point value of volumetric flow has been selected, whether the regulator is within its operating range, and how strongly the regulator throttles the flow.

In addition, the basic construction and the manufacturing technology of the regulator shall be such that the required calibration measures are as simple and as few as possible and independent of the setting of volumeteric flow. In regulators known at present, the movement of the regulating member cannot be steplessly limited. Therefore, regulators of prior art cannot be used at all for mere balancing based on so-called single pass regulation, which would eliminate the risk of binding of the means. Secondly, regulators of prior art cannot be used for restricted and controlled correction. Thirdly, regulators of prior art cannot be used in the best possible way in air-conditioning installations where the air quantities are varied, e.g. different air quantities in the daytime and during the night.

In the regulators of the prior art, the force that is used to counteract the regulating member is a mass or a spring, or a spring and bellows in combination. Each design has its advantages and disadvantages. Disadvantages connected with the use of springs are e.g. their relaxing, inaccuracies of manufacture, liability to suffer damage, etc. Disadvantages encountered when a mass is used as counterforce are the facts that the regulator can only be installed in a horizontal duct or passage, that the axis has to be horizontal with reference to the direction of flow at all times and that the mass must always be on one and the same side of the passage. Advantages of a mass in the role of counterforce are, for instance, reliability in use, manufacturing accuracy and permanence. Disadvantages of the use of springs combined with bellows are that the design is more liable to disturbances and more expensive than a mere spring and has a shorter life span.

In regulators of prior art a particular damping means is required to allay the oscillations, or hunting, of the regulating member. In some designs of prior art, damping of the dashpot type is used. In another regulator of the prior art, bellows type damping is used. Disadvantages of the damping designs described above are, for instance, that the damping designs may in the course of time either bind or be blocked or break, that they require maintenance, and that they may impair the accuracy.

SUMMARY OF THE INVENTION

The object of the invention is to provide an improvement of regulator designs known in the art. The more detailed aim of the invention is to provide a flow regulator in which the drawbacks present in regulators of prior art have been overcome.

The aims of the invention are achieved with a flow regulator which is mainly characterized in that the range of operation of the flow regulator is changeable by regulating the size of the effective flow aperture, between the regulating member and the flow passage, corresponding to various angular positions of the regulating member.

In an advantageous embodiment of the invention, the flow regulator is characterized in that the effective size of the regulating member is changeable for changing the size of the effective flow aperture. In an advantageous embodiment, the regulating member is composed of parts overlapped with each other and disposed to move in a way enabling the effective size of the regulating member to be changed. In an advantageous embodiment, the effective flow aperture is changeable by moving the regulating member in the flow passage, which has a variable cross section area, in the flow direction of the gaseous substance. In an advantageous embodiment, the effective flow aperture is changeable by the aid of a separate regulating member composed of one or more parts and placed in the flow passage. For such a regulating member, for instance, different kinds of iris regulators may be used.

In an advantageous embodiment, the operating range of the flow regulator may be changed by the aid of a shiftable mass causing a countertorque dependent on the position of the regulating member.

Several advantageous embodiments of the invention are characterized in that the regulating member is a slightly curved plate. The turning angle between the initial and ultimate positions of the regulating member is substantially of the same order at different volumetric flow rates, the differential pressure being the same. The initial and ultimate positions of the regulating member are dependent on the magnitude of the volumetric flow rate, the differential pressure being the same. The flow regulator is advantageously provided with adjustable and/or self-adjusting limiting members to limit the differential pressure range of the flow regulator, the limiting members being disposed to limit the angular movement of the regulating member.

By the flow regulator of the invention several remarkable advantages are gained. First, the set-point value of the flow regulator can be regulated in a relatively wide volumetric flow range, e.g. duct velocity 2-8 m/s, without any change of the pressure range in which the flow regulator operates. In addition, the flow regulator operates with lower differential pressure, e.g. about 20 Pa, than any regulator known in prior art, where the operating range is 20-200 Pa throughout. In the regulator of the invention, it has been understood to make use of a turning angle of the regulating member about 90°, thus affording, with additional adjustment of the effective flow aperture, a large movement of the regulating member relative to the change of differential pressure, and a relatively wide operating range.

Secondly, in the regulator of the invention the volumetric flow rate can be regulated steplessly and simply at the site of installation, even if the regulator has already been installed, simply by turning a control knob on the flow regulator. The volumetric flow rate may be directly read on a scale, as well as the degree in which the regulator throttles the flow, and whether the regulator is within its operating range, i.e., whether the regulator admits the correct air quantity, or too little or too much.

Thirdly, in the flow regulator of the invention the movement of the regulating member may be limited, or the movement of the regulating member may, if needed, be entirely arrested. Thanks to this characteristic feature, the flow regulator of the invention may also be used in applications such as balancing based merely on so-called single pass regulation, and secondly the flow regulator may be used for minor controlled correction, and thridly the flow regulator may successfully be used in air-conditioning installations where centralized altering of the air flows is desirable.

In the flow regulator of the invention, a mass is used advantageously for counterforce. However, in the regulator of the invention the disadvantages of a mass have been eliminated in practice. The flow regulator of the invention may be installed in a passage with any direction, and the mass used for counterforce can be disposed on either side of the passage or duct. This is based on the fact that the turning axis of the regulating member is mounted horizontally by the aid of a levelling means provided in the flow regulator, and the mass is moreover so positioned that the mass is turned through the same angle but in opposite direction as is the deviation of the particular instance of installation from a separately determined basic installation.

The flow regulator of the invention also requires no separate oscillation inhibiting means, certainly no oscillation inhibitor which would be likely to bind or accumulate dirt or be blocked: as a rule the counterpressure in the duct system is alone enough to keep the regulating member stable. Factors contributing to this favourable feature are in the first place that the regulating member is slightly curved and that the regulating does not nearly completely close the passage in any position. As a result, the air is enabled to flow past on all sides of the regulating member even when the regulating member is in the "closed" position. Further factors contributing to the favourable feature just described are for instance the size and shape of the regulating member, the location of the turning axis of the regulating member with reference to the regulating member, the size and location of the counterweight, and the limiters of the regulating member.

The fact that the air can flow past all around the regulating member entails even other advantages in the domains of air distribution technique and acoustics.

Thanks to the slightly curved regulating member, the flow regulator can be made accurate, silent, and a slightly curved regulating member like this moves smoothly from one end position to the other.

BRIEF DESCRIPTION OF THE DRAWINGS

The invention is described in detail, referring to an advantageous embodiment of the invention presented in the figures of the drawing attached, but to which the invention is not meant to be exclusively confined.

DESCRIPTION OF THE PREFERRED EMBODIMENTS

Figure 1:
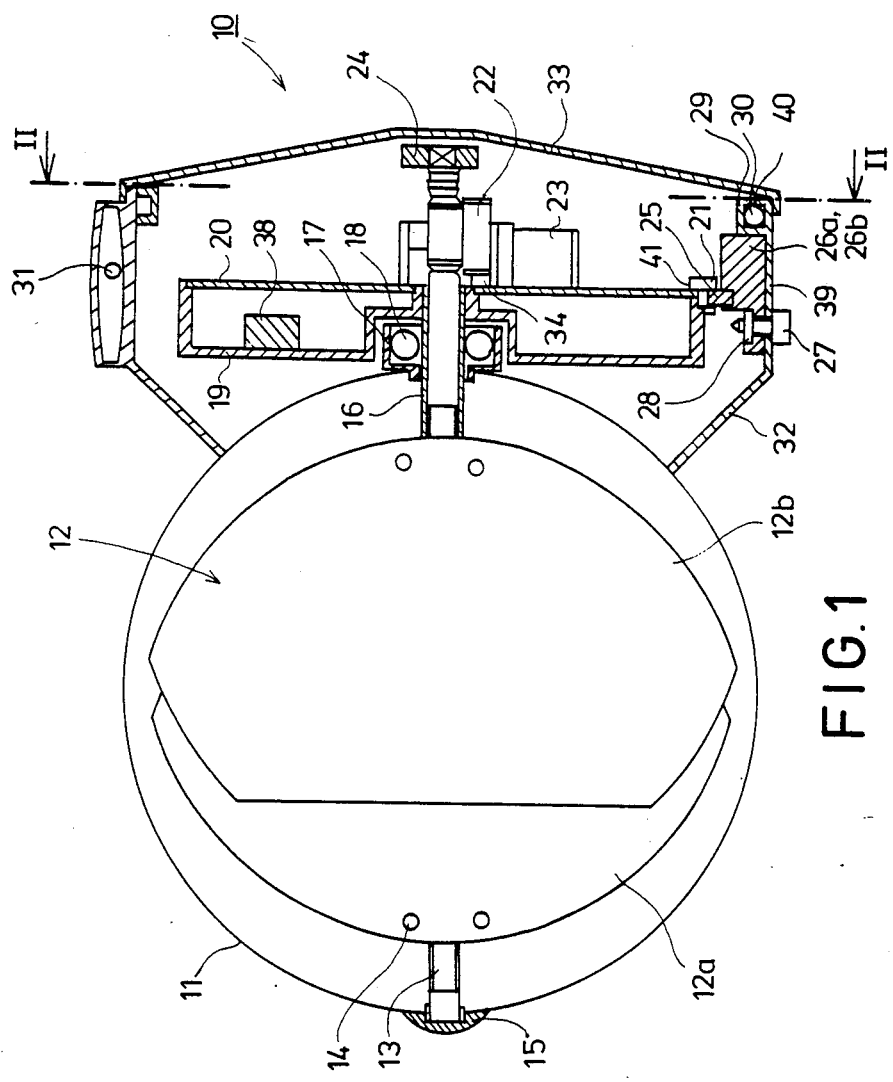
FIG. 1 presents an advantageous embodiment of the invention in partly sectioned elevational view.
Figure 2:
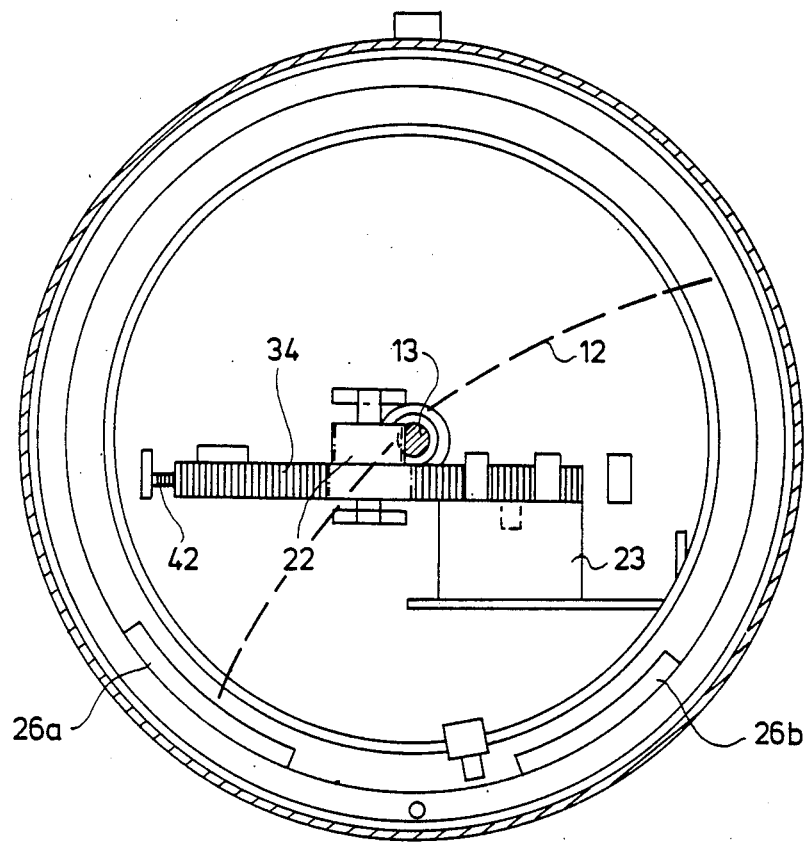
FIG. 2 shows the section along the line II—II in FIG. 1.

In the embodiment of FIGS. 1 and 2, the constant flow regulator of the invention has been generally indicated by reference numeral 10. The regulator 10 comprises an envelope 11 and a regulating member 12 disposed within the envelope 11. In this embodiment, the regulating member 12 is a curved flap-like regulating member composed of two curved flaps 12a and 12b overlapped with each other. The regulating member 12 is attached to a turnable shaft 13 by the aid of a regulating and fixing nut 14 and a combined sleeve, regulating and fixing nut 16. The shaft 13 is rotatably carried by bearings 15 and 18 in the envelope 11. The regulating member 12 turns by effect of the air flowing in the flow passage confined by the envelope 11, and the counter-torque generated by the weight 23 is disposed to set the regulating member 12 in a position producing the requisite throttling. The weight 23 is integrally connected with the regulating member 12 by means of the sleeve, control and fixing nut 16 and by a member 19 and cover 20 rotatably attached thereto, and it rotates along with the turning of the regulating member 12. The axis 13 is installed horizontally by the aid of a balance and a levelling ball 31 in the protecting case 32.

The operating range of the constant flow regulator 10, as regards volumetric flow rate, can be changed by turning the regulating knob 24, whereby in this embodiment the size of the flap-resembling regulating member 12 and simultaneously the effective flow aperture, the location of the weight and the initial and ultimate positions of the regulating member 12 are changed. The halves 12a and 12b of the flap-like regulating member 12 move in different directions with reference to each other on the shaft 13, by effect of the different-handed threads on the shaft 13 and in the regulating nuts 14,16. One end of the shaft 13 is laterally fixed in the bearing 15, whereby the effect of the adjustment also causes the member 19, which has by mediation of the sleeve 16 been mounted on the flap-like closing member 12 on one half 12b thereof rotatably, and the cover, attached to said member 19, to move in the direction of the shaft 13. The gear 22 attached to the cover 20 is in contact with the shaft 13, and the gear 22 is due to the grooves on the shaft 13 and to the sidewise movement of the rotatably disposed member 19 set in rotation, whereby the gear 22 at the same time by means of the pinion rack 34 shifts the weight 23.

Figure 3A:
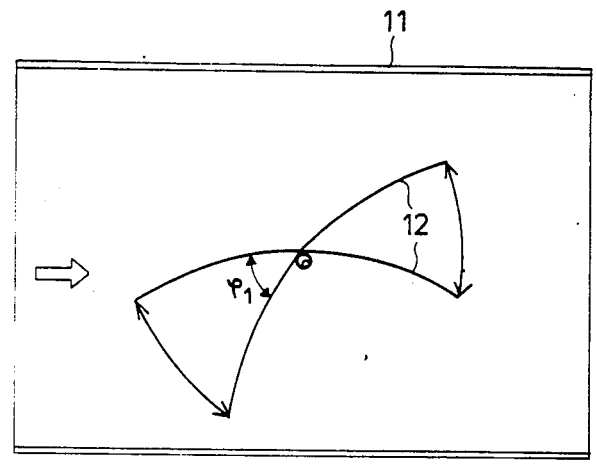
FIG. 3A presents in elevational view the initial and ultimate positions of the regulating member of the flow regulator at high volumetric flow rate.
Figure 3B:
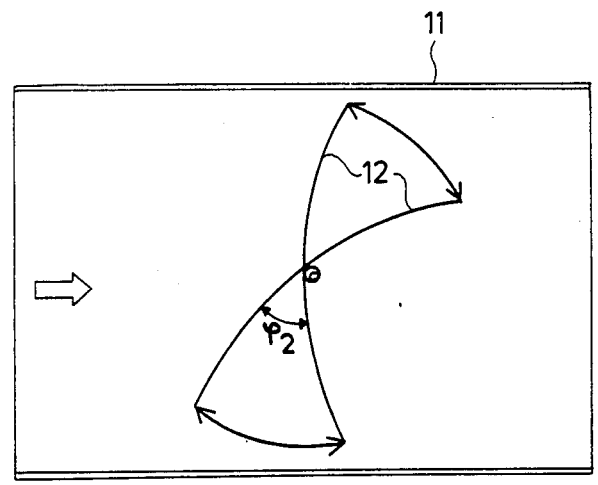
FIG. 3B presents in elevational view the initial and ultimate positions of the regulating member of the flow regulator at low volumetric flow rate.

In FIGS. 3A and 3B is observed that at high volumetric flow rate, at the smallest differential pressure of the operating range, the regulating member 12 is in a more horizontal position than at a small volumetric flow rate at the corresponding differential pressure.

Similarly, it is observed that at a small volumetric flow rate at the highest differential pressure of the operating range, the regulating member 12 is in a more vertical position than at a large volumetric flow at the corresponding differential pressure.

The position of the regulating member 12 at the highest volumetric flow rate and at the smallest differential pressure of the operating range advantageously deviates about 90° from the position of the regulating member 12 at the smallest volumetric flow rate and the highest differential pressure of the operating range. In contrast, the turning angle $\phi_2$ is substantially of the same order as the respective turning angle $\phi_1$ for high volumetric flow rate when the differential pressure is the same. Thus, in the regulator 10 of the invention, the rotation angle $\phi_1,\phi_2$ of the regulating member 12 for the minimum and maximum differential pressures is substantially of the same order at different volumetric flow rates. At the same minimum and maximum values of the differential pressure $\Delta p$, the angle of rotation $\phi_1,\phi_2$ is advantageously about 60°.

Figure 4A:
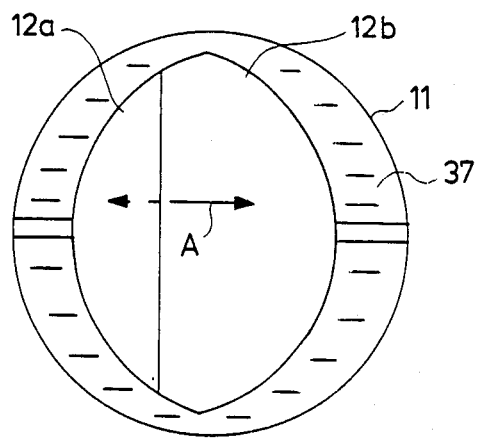
FIG. 4A presents the effective flow aperture of the flow regulator of the invention at its smallest, with the regulating member so regulated that the effective flow aperture is large, viewed in the direction of flow.
Figure 4B:
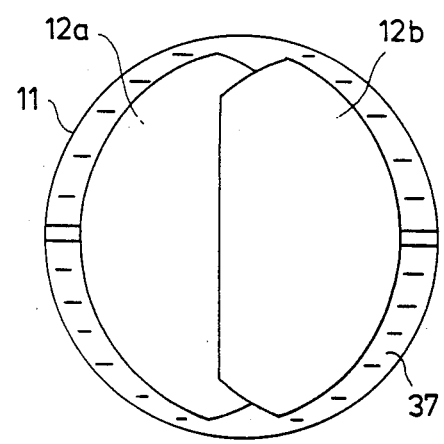
FIG. 4B presents the effective flow aperture of the flow regulator of the invention at its smallest, with the regulating member so regulated that the effective flow aperture is small, viewed in the direction of flow.

In the embodiment of FIGS. 4A and 4B, in the flow regulator 10 of the invention the effective flow aperture 37 is changed by regulating the size of the regulating member 12. In this embodiment, the size of the effective flow aperture 37 is changed by moving the halves 12a and 12b of the regulating member 12 in the manner indicated by the arrow A in FIG. 4A.

Figure 4C:
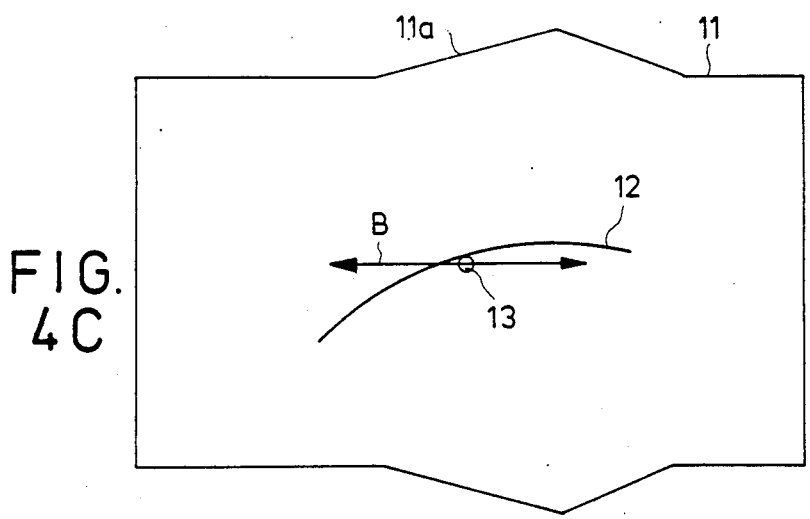
FIG. 4C illustrates in elevational view the changing of the effective flow aperture of the flow regulator in a flow passage with variable cross section.

In the embodiment of FIG. 4C, the effective flow aperture 37 is changed by moving the regulating member 12 in the flow passage 11,11a with variable cross-section as indicated by the arrow B, in other words, by shifting the regulating member 12 in the direction of flow.

Figure 4D:
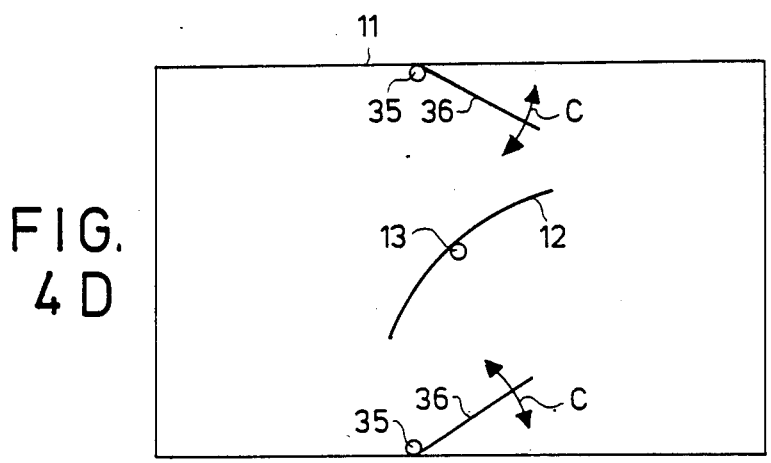
FIG. 4D illustrates in elevational view the changing of the effective flow aperture of the flow regulator by means of a separate regulating member.

In the embodiment of FIG. 4D, the effective flow aperture 37 is changed by regulating the flow aperture by the aid of a separate regulating member 36, consisting of one or several parts, placed in the flow passage. The shafts of the regulating members 36 are denoted by the reference numeral 35. The regulating members 36 may be rotated around the axes 35 as indicated by arrow C.

Figure 5:
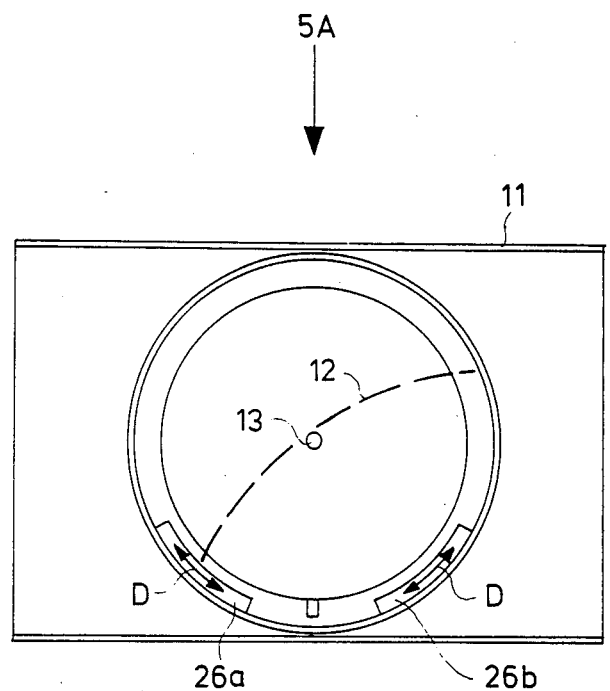
FIG. 5 presents the principle of limiting the differential pressure range of the flow regulator, in a schematic elevational view.
Figure 6:
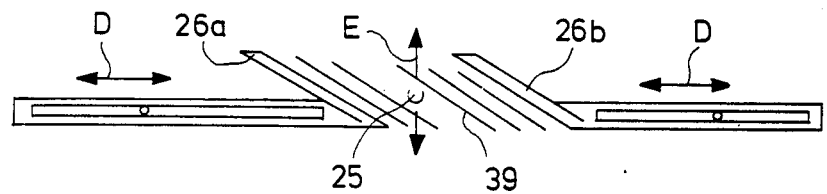
FIG. 6 shows a detail of FIG. 5 on a larger scale, viewed in the direction 5A.

In the flow regulator 10 of the invention, the differential pressure range is limited by limiting members 25 and 26a,26b. When the limiters 26a and 26b are moved as indicated by arrows D in FIG. 5, the movement of the regulating member 12 is limited. The limiters 26a and 26b are advantageously self-regulating in accordance with the volumetric flow rate that has been selected, as shown in FIG. 6. The limiters 26a and 26b have bevelled faces in that case. The limiters 26a and 26b regulate themselves when a limiter pin 25 moves as the volumetric flow rate is regulated, in the manner indicated by the arrow E in FIG. 6. The movement of the flap-like regulating member 12 of the constant flow regulator 10 may also be arrested totally or partially with the aid of the adjustable limiters 26a and 26b. The limiter pin 25 and the adjusting scale 39 on the protective case 32 indicate the differential pressure $\Delta p$ acting across the constant flow regulator 10. When the limiter pin 25 touches the limiter 26a, the differential pressure is at the lowest, and at the limiter 26b it is at the highest (FIG. 6). When the limiter pin 25 is intermediate between the limiters 26a and 26b, the means is in the operating range; if not, either too much or too little air is admitted.

Figure 7:
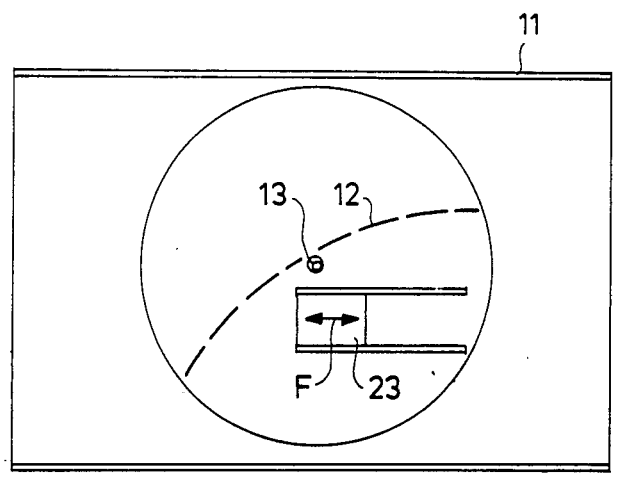
FIG. 7 shows a way of changing the operating range of the flow regulator of the invention, in a schematic elevational view.

As shown in FIG. 7, the operating range of the flow regulator 10 can be changed by the aid of a movable mass or weight 23 by shifting the weight 23 as indicated by the arrow F.

The weight 23 and the limiting members 26a,26b and 25 automatically assign different initial and ultimate positions to the flap-like regulating member 12 at different volumetric flow rates.

Figure 8:
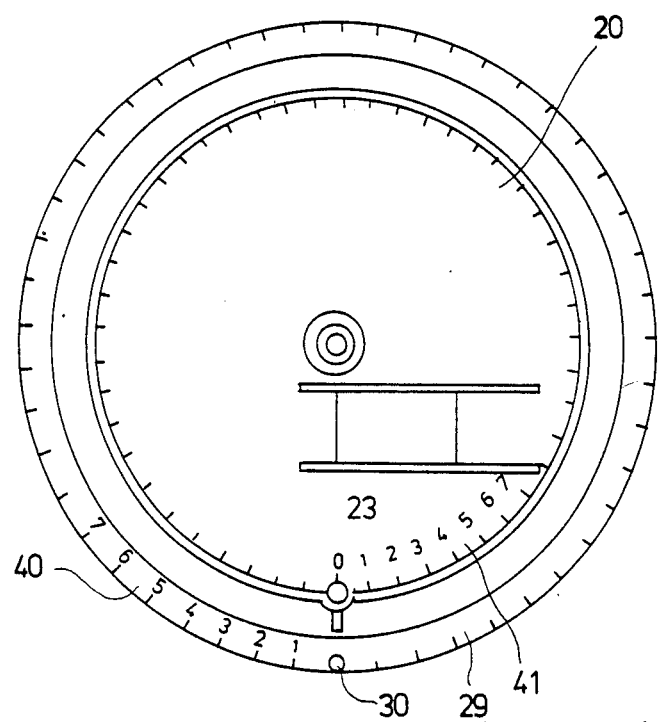
FIG. 8 presents the flow regulator of FIG. 1, viewed in the direction from the cover of the protecting case, this cover being removed.

As shown in FIGS. 1,2 and 8, in the constant flow regulator 10 of the invention, the effect of gravity can be made the same, independent of the installation mode by the aid of the fixable cover 20 which is adjustable with reference to the turning axle 13 of the regulating member 12, of the ball case 29 on the protecting case 32 and of the ball 30 moving in the case 29. The constant flow regulator 10 is balanced by a balancing weight 38 in connection with manufacturing, first without the countertorque produced by the weight 23. The ball 30 and the scale 40 on the case 29 show in which position the means is. The cover 20 is turned to a position corresponding to the position indicated by the ball 30 by the aid of a scale 41 on the cover 20 and is locked by a set screw 21.

Figure 9:
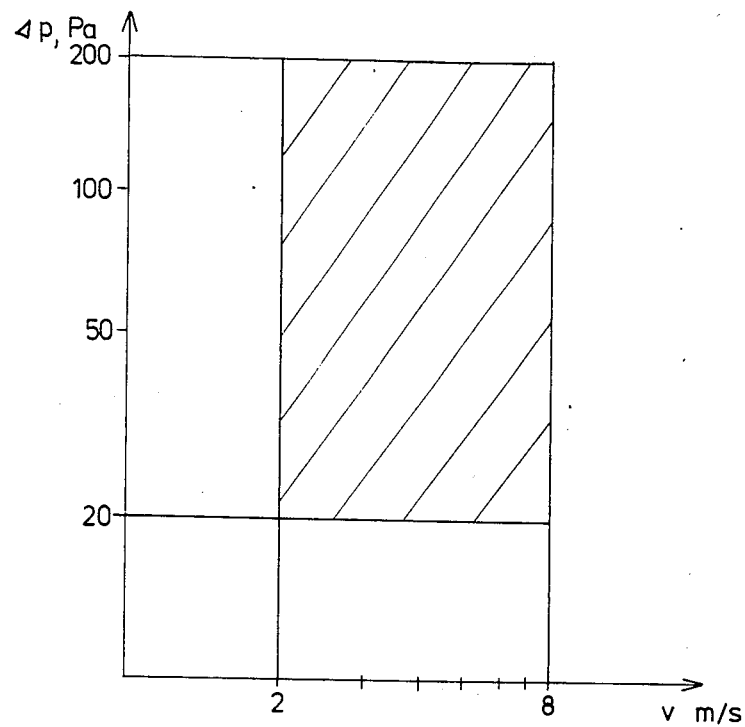
FIG. 9 presents graphically the operating range of the flow regulator of the invention.

The operating range of the flow regulator 10 of the invention regarding volumetric flow rate V̇ can be steplessly regulated so that the differential pressure range in which the flow regulator 10 operates will not change, as presented in FIG. 9, or it can be made to change in any desired manner. In FIG. 9, the hatched area indicates the range in which the flow regulator 10 of the invention operates. In the examples of FIG. 9, the ratio of the top and lowest pressures of the operating range is 1:10, or e.g. 20–200 Pa, and the ratio 1:4 of lowest and highest volumetric flow rate V̇ is such that it corresponds e.g. to air flow velocity 2–8 m/s. The operating range of the constant flow regulator 10 is regulated, as already described, by turning the regulating knob 24. The limiter pin 25 on the rotatably disposed member 19, the limiters 26a,26b changeable in the direction of the shaft 13 and the weight 23 give the regulating member 12 different initial and ultimate positions at various volumetric flow rates. The end of the gear rack 34 and the volumetric flow rate scale 42 on the cover 20 indicate the air flow to which the constant flow regulator 10 has been regulated. The limiter pin 25 and the scale 39 adjacent to the limiter pin 25 on the protecting case 32, in other words, the scale for setting the limiters 26a and 26b, indicate the differential pressure Δp across the regulator 10. If the limiter pin 25 is against one or the other limiter 26a and 26b, the flow regulator 10 is not in the operating range, and too much or too little air passes through the flow regulator 10. The position of the limiter pin 25 with reference to the scale 39 and the limiters 26a and 26b may be determined from outside the means.

In the flow regulator 10 of the invention, the movement of the regulating member 12 may be restricted, or the regulating member 12 may be completely arrested by the aid of the adjustable limiters 26a and 26b, as was already presented above. This affords various possibilities as shown in FIG. 10.

Figure 10:
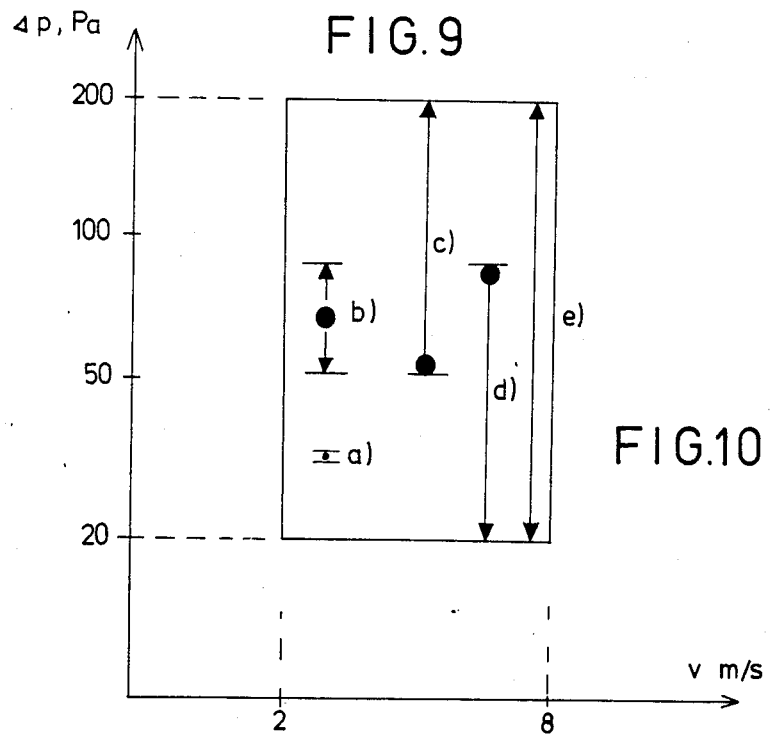
FIG. 10 shows graphically various service applications of the flow regulator of the invention.

The instance (a) displayed in FIG. 10 illustrates the case that the regulator 10 is only used for balancing an air-conditioning installation. When an air-conditioning installation is being balanced, the regulating member 10 automatically assumes the correct position. Thereafter, the regulating member 10 is arrested by means of the limiting members 26a and 26b. The air-conditioning installation can be balanced in this way with flow regulators, which means that the air quantities are correct at every point in the air-conditioning installation, but the regulators 10 installed in the air-conditioning installation do not strive to maintain the volumetric flow rate V̇ unchanged if it tends to change due to an external influence. The air flow may then be altered centrally. Since they have been arrested, the regulators 10 are also under no risk of becoming stuck.

The instance (b) displayed in FIG. 10 illustrates the case in which the flow regulator 10 is given a small chance of correction, e.g. ±20 Pa. The regulating members 10 assume the correct position at balancing. The regulating member 12 of the flow regulators 10 are not completely arrested with the limiters 26a and 26b in this case; the regulating member 12 is rather given a small latitude of movement in both directions. The flow regulator 10 will then in the event of minor pressure variations correct the volumetric flow rate if the magnitude of the volumetric flow tends to change. On the other hand, if for some reason the flow regulator 10 gets stuck, it will cause no major error even then.

The instance (c) displayed in FIG. 10 illustrates the case in which the air-conditioning installation is balanced with the largest air quantity. The flow regulator 10 is used in air-conditioning installations where air flows of different magnitudes are used. Usually a higher volumetric flow rate is applied e.g. during the daytime. When balancing the air-conditioning installation, the movement of the regulating member 12 is limited by the lowest pressure limiter 26a. One achieves hereby that the regulating member 12 prevents the increase of the air quantity in day operation but causes no problems whatsoever in night operation when the quantity of air is reduced by centralized action. If the regulating member 12 were allowed to turn to its fully open position, some point in the air-conditioning system could in night operation receive nearly as much air as in daytime operation, and another point would correspondingly receive very little.

The instance (d) displayed in FIG. 10 illustrates the case in which the flow regulator 10 is used in air-conditioning installations where air flows of different magnitudes are used. The installation is balanced with a smaller air quantity. The movement of the regulating member 12 of the flow regulator 10 is limited with the top pressure limiting member 26b. The regulating member 12 cannot turn into its closed position, and the regulating member 12 will thus cause no problems when the air flow is increased by centralized action.

The instance (e) displayed in FIG. 10 illustrates the case in which the flow regulator 10 is permitted to correct the air flow rate throughout the differential pressure range in which the flow regulator 10 operates. The limiting members 26a and 26b are in their extreme positions.

In the foregoing are presented merely some of the advantageous embodiments of the invention, and it is obvious to a person skilled in the art that various modifications may be accomplished in them within the scope of the inventive idea presented in the claims following below. For instance, it is not the intention to confine the invention exclusively to ducts or passages having a circular cross section.

We claim:

1. A flow regulator for gaseous substances, particularly for air in air-conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope to define a flow aperture therebetween, said member disposed to turn with increasing differential pressure progressively crosswise with reference to the direction of flow and assume an equilibrium position in response to a torque produced by the gaseous substance on the flow regulating member and a countertorque dependent on the position of the regulating member, such that the requisite pressure drop for maintaining the volumetric flow at pre-selected magnitude is achieved, comprising means for selecting the overall range of operation of the flow regulator including means for selectively varying the size of the effective flow aperture defined between the regulating member and the flow passage for each angular position of said regulating member.

said size of said adjustable flow aperture, at each angular position of said regulating member, being fixed once said regulator is in operation.

2. A flow regulator according to claim 1, characterized in that said varying means constitute means for varying the effective size of the regulating member within the flow passage.

3. A flow regulator according to claim 1, characterized in that said varying means are constituted by the regulating member being slidably situated along an axis of a flow passage of changing crosssection in the direction of flow of the gaseous substance.

4. A flow regulator according to claim 1, characterized in that said varying means comprise a separate regulating member placed in the flow passage.

5. The regulator of claim 4, wherein said separate regulating member is mounted on a shaft.

6. The regulator of claim 5, additionally comprising a third regulating member mounted on a second shaft.

7. A flow regulator according to claim 1, characterized in that said means for varying the size of the effective flow aperture include means for changing the countertorque for each angular position of the regulating member.

8. A flow regulator according to claim 7, characterized in that said means for changing the countertorque for each angular position of the regulating member include a movable mass.

9. A flow regulator according to claim 1, characterized in that the flow regulator is provided with adjustable or self-adjusting limiters for limiting the differential pressure range of the flow regulator, said limiting members being disposed to limit the turning movement of the regulating member.

10. The regulator of claim 9, additionally comprising a limiter pin movably situated between a pair of said limiters, said pin being movable in response to changes in the differential pressure.

11. A flow regulator according to claim 1, characterized in that said means for selecting the overall range of operation of the flow regulator being partially situated outside of the flow passage.

12. A flow regulator according to claim 1, characterized in that said selecting means are disposed inside said envelope such that air flows substantially on all sides past the regulating member.

13. The regulator of claim 1, wherein a turning angle for said regulating member is about 60°.

14. The regulator of claim 1, wherein said size of said adjustable flow aperture, at each angular position of said regulating member, is fixed prior to introduction of the fluid into said passage.

15. The regulator of claim 14, wherein said size of said adjustable flow aperture, at each angular position of said regulating member, is fixed prior to readjustment and restarting of the air-conditioning and ventilation installation.

16. A flow regulator for gaseous substances, particularly for air in air-conditioning and ventilation installations, for maintaining the volumetric flow rate of the gaseous substance at desired magnitude with sufficient accuracy when differential pressure acting across the flow regulator varies within given limits, said flow regular comprising an envelope and a regulating member turnably disposed in a flow passage confined by the envelope to define a flow aperture therebetween, said member disposed to turn with increasing differential pressure progressively crosswise with reference to the direction of flow and assume an equilibrium position in response to a torque produced by the gaseous substance on the flow regulating member and a countertorque dependent on the position of the regulating member, such that the requisite pressure drop for maintaining the volumetric flow at pre-selected magnitude is achieved, comprising means for selecting the overall range of operation of the flow regular including means for selectively varying the size of the effective flow aperture defined between the regulating member and the flow passage for each angular position of said regulating member characterized in that said varying means constitute means for varying the effective size of the regulating member within the flow passage, and characterized in that said varying means are constituted by the regulating member being composed of parts placed to overlap and disposed to move such that the effective size of the regulating member is changeable.

17. The regulator of claim 16, wherein said parts are threadingly situated about a turnable shaft, independently from one another, and said varying means additionally comprise knob means connected with said shaft for turning the same.

18. A flow regulator for gaseous substances, particularly for air in air conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope to define a flow aperture therebetween, said member disposed to turn with increasing differential pressure progressively crosswise with reference to the direction of flow and assume an equilibrium position in response to a torque produced by the gaseous substance on the flow regulating member and a countertorque dependent on the position of the regulating member, such that the requisite pressure drop for maintaining the volumeric flow at pre-selected magnitude is achieved, comprising means for selecting the overall range of operation of the flow regulator including means for selectively varying the size of the effective flow aperture defined between the regulating member and the flow passage for each angular position of said regulating member, wherein said regulating member is turnably disposed upon a shaft extending through said flow passage, and additionally comprising means for counteracting effect of gravity, comprising a cover rotatably to attached said shaft, an outer protective casing situated about said cover and shaft, scale means situated on said protective casing, and a movable indicator situated adjacent said scale means, whereby said cover may be rotated to a position indicated by said indicator on said scale means.

19. The regulator of claim 18, wherein said indicator is a sphere, said scale means are constituted by a container for said sphere disposed upon said protective casing, and additionally comprising a scale situated on said rotatable cover for aligning the same with said sphere, means for locking said cover in position, and a balancing weight disposed in said cover.

20. a flow regulator for gaseous substances, particularly for air in air-conditioning and ventilation installations, for maintaining the volumetric flow rate of the gaseous substances at desired magnitude with sufficient accuracy when differential pressure acting across the flow regulator varies within given limits, said flow regulator comprising an envelope and a regulating member turnably disposed in a flow passage confined by the envelope to define a flow aperture therebetween, said member disclosed to turn with increasing differential pressure progressively crosswise with reference to the direction of flow and assume an equilibrium position in response to a torque produced by the gaseous substance in the flow regulating member and a countertorque dependent on the position of the regulating member, such that the requisite pressure drop for maintaining the volumetric flow at pre-selected magnitude is achieved, comprising means for selecting the overall range of operation of the flow regulator including means for selectively varying the size of the effective flow aperture defined between the regulating member and the flow passage for each angular position of said regulating member, characterized in that said means for varying the size of the effective flow aperture include means for changing the countertorque for each angular position of the regulating member, said means for changing the countertorque for each angular position of the regulating member include a movable mass, wherein said countertorque changing means include means for adjusting position of said mass, comprising rotatable shaft means extending through said flow passage and upon which said regulating member is situated, knob means connected with said shaft for turning the same, and gear means interconnecting said shaft means and said mass.

21. A flow regulator for gaseous substances, particularly for air in air-conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope to define a flow aperture therebetween, said member disposed to turn with increasing differential pressure progressively crosswise with reference to the direction of flow and assume an equilibrium position in response to a torque produced by the gaseous substance in the flow regulating member and a counter torque dependent on the position of the regulating member, such that the requisite pressure drop for maintaining the volumetric at pre-selected magnitude is achieved, comprising means for selecting the overall range of operation of the flow regulator including means for selectively varying the size of the effective flow aperture defined between the regulating member and the flow passage for each angular position of said regulating member, characterized in that said means for varying the size of the effective flow aperture include means for changing the counter torque for each angular position of the regulating member, said means for changing the countertorque for each angular position of the regulating member include a movable mass, wherein said mass is interconnected with said regulating member through a sleeve situated about a shaft extending through said passage upon which said regulating member is rotatably disposed, whereby said mass rotates along with rotation of said regulating member.

22. A flow regulator for gaseous substances, particular for air in air-conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope to define a flow aperture therebetween, said member disposed to turn with increasing differential pressure progressively crosswise with reference to the direction of flow and assume an equilibrium position in response to a torque produced by the gaseous substance on the flow regulating member and a countertorque dependent on the position of the regulating member, such that the requisite pressure dropp for maintaining the volumetric flow at pre-selected magnitude is achieved, comprising means for selecting the overall range of operation of the flow regulator including means for selectively varying the size of the effective flow aperture defined between the regulating member and the flow passage for each angular position of said regulating member, additionally comprising means for substantially horizontally maintaining a shaft extending through said passage and upon which said regulating member is pivotally disposed, comprising a protective casing, and a levelling ball disposed in said protective casing.

* * * * *